US008831505B1

(12) United States Patent
Seshadri (10) Patent No.: US 8,831,505 B1
(45) Date of Patent: Sep. 9, 2014

(54) METHOD AND APPARATUS FOR EFFECTIVELY CAPTURING AND BROADCASTING A TRADITIONALLY DELIVERED CLASSROOM OR A PRESENTATION

(76) Inventor: Prasad Seshadri, San Jose, CA (US)

( * ) Notice: Subject to any disclaimer, the term of this patent is extended or adjusted under 35 U.S.C. 154(b) by 1430 days.

(21) Appl. No.: 12/125,395

(22) Filed: May 22, 2008

(51) Int. Cl.
*G09B 3/00* (2006.01)
*G09B 5/06* (2006.01)
*H04N 5/232* (2006.01)

(52) U.S. Cl.
CPC .............. *G09B 5/06* (2013.01); *H04N 5/23216* (2013.01)
USPC ...................................... 434/351; 348/211.11

(58) Field of Classification Search
CPC ........ G09B 7/00; G09B 5/06; H04N 5/23216; H04N 7/08
USPC ................ 709/231; 715/230, 231; 348/211.8, 348/222.1, 14.11, 211.11; 434/322, 350, 434/353, 351, 365
See application file for complete search history.

(56) References Cited

U.S. PATENT DOCUMENTS

| 4,596,041 | A  | * | 6/1986  | Mack ............................. 455/507 |
| 4,712,093 | A  | * | 12/1987 | Reichel et al. ................. 340/540 |
| 6,665,835 | B1 | * | 12/2003 | Gutfreund et al. ............ 715/202 |
| 6,909,874 | B2 | * | 6/2005  | Holtz et al. .................... 434/362 |
| 6,992,702 | B1 | * | 1/2006  | Foote et al. ................. 348/211.8 |
| 7,349,005 | B2 | * | 3/2008  | Rui et al. .................... 348/14.11 |
| 7,554,576 | B2 | * | 6/2009  | Erol et al. ................... 348/211.3 |
| 2002/0110089 | A1 | * | 8/2002 | Goldshtein et al. ........... 370/252 |
| 2004/0002049 | A1 | * | 1/2004 | Beavers et al. ............... 434/350 |
| 2012/0237914 | A1 | * | 9/2012 | Spector ..................... 434/307 R |

* cited by examiner

*Primary Examiner* — Peter Egloff (57) ABSTRACT

A method and system for recording classroom Instruction/Presentation, comprising two or more video cameras, a first camera assigned to an Instructor/Presenter/presenter and a second camera assigned to the audience, wherein the cameras are pan, tilt, zoom(PTZ)-controllable over a network. The method and system includes a first microphone for the Instructor/Presenter, and a plurality of cell-phones or handheld wireless microphones configured to function as audience microphones. Additionally included is a production control computer connected to the cameras via a network, wherein the production control computer is operable by an operator who can control multiple cameras through a single production control user interface over a network, the production control computer is configured with user interface software and controls. Further, the system and method includes a content viewer user interface on which user content is delivered over the Internet.

1 Claim, 12 Drawing Sheets

Figure 2a: Typical prior art setup of existing video based distance learning system Figure 2b: Architecture of EduSpot

Figure 3

TRANSMISSION

Figure: 4

| | |
|---|---|
| Event Name | Local |
| Performer | Eduspot |
| Episode | Without DSL2 |
| Description | Introduction |
| Email Address | prasadseshadri@pandacs.com; rajeev@pa |
| Copyright | PandaCS |

☐ Generate high quality video as well

[Recorder Info]  [Start]  [Stop]

Error: Cannot communicate with control station

Figure 8 : Motion estimation

METHOD AND APPARATUS FOR EFFECTIVELY CAPTURING AND BROADCASTING A TRADITIONALLY DELIVERED CLASSROOM OR A PRESENTATION

CORRESPONDING RELATED APPLICATIONS

The present invention claims the benefit of U.S. Provisional Patent Application Ser. No. 60/939,790 by Prasad Seshadri, filed on May 23, 2007, and entitled "Method and apparatus for effectively capturing and broadcasting a traditionally delivered classroom or a presentation". The present application claims the benefit of and priority to this provisional application, the entire contents of which are incorporated by reference herein in its entirety. Reference is also hereby made to U.S. patent application Ser. No. 11/171,825 by Prasad Seshadri, filed on Jun. 29, 2005, entitled "Method and apparatus for effectively capturing a traditionally delivered classroom or a presentation and making it available for review over the Internet using remote production control" and incorporated by reference herein in its entirety.

BACKGROUND

Field of the Invention

Instruction/Presentational content generated by university personnel as well as organizational wisdom created by professionals in organizations are either being lost to posterity or not being harnessed to their full potential, since the content disappears and is preserved imperfectly only in the minds of a few. One of the greatest challenges in introducing technology into classroom or a presentation context is resistance to technology on the part of a traditional Instructor/Presenter, who must focus on Instruction/Presentation and the students/audience rather than be distracted by presentation technology issues, which do not represent his/her core interest or objective, and is therefore unwilling to make the adjustments or compromises necessary to adapt to technology.

SUMMARY

A viable platform and methodology to routinely and effectively capture Instruction/Presentational content and make it available with minimum delay to either onsite or remotely located personnel as well as for future audiences is explained.

This includes a methodology of optimizing the capture of good video quality with simplified video production methodology, attempting to capture all the action in a traditional live Instructor/Presenter based classroom or a presentation. The invention aims to ensure that the recording of the classroom does not require the Instructor/Presenter to substantially deviate from the delivery method he or she is accustomed to and yet capture all the typical elements of classroom Instruction/Presentation. Additionally, the Instructor/Presenter is not required to operate any equipment other than the ones he or she is currently accustomed to, or none at all, if he/she does not wish to.

An embodiment includes a system for recording classroom Instruction/Presentation, comprising two or more video cameras in a classroom or at any real-time event, at least a first camera assigned to an Instructor/Presenter and at least a second camera assigned to an audience, wherein the cameras are pan, tilt, zoom(PTZ)-controllable over a network. The embodiment also includes an Instructor/Presenter personal computer, a first microphone assigned to the Instructor/Presenter, and a second plurality of cell-phones or handheld wireless microphones configured to function as audience microphones. Additionally included is a classroom production and control server providing audio and video input selection and recording, connected via the network to the classroom system, and providing control of classroom components, routing and encoding of audio and video streams, and temporary storage of content. Preferably, a production control computer is connected to the cameras via the network, such that the production control computer is operable by an operator who can control multiple cameras over the network through a single production control user interface. And a data center receives data feeds from a plurality of classroom servers through a router, is configured to perform content management, and is further configured to feed captured event sessions to remotely located students through streaming servers.

Included in an embodiment is a method for recording of classroom Instruction/Presentation, comprising the steps of displaying on a user interface of a production control computer, video signals from single or plurality of video cameras, and audio signals from a plurality microphones deployed in a classroom, controlling from the user interface, the video cameras and microphones via a network connected to the production control computer. In the embodiment, a first camera is dedicated to the Instructor/Presenter, and at least one of the cameras is dedicated to an audience. Additionally, a first microphone is dedicated to the Instructor/Presenter, and a plurality of audience cell-phones, configured to function as the microphones, over a VOIP network, are each dedicated to each member of the audience. The embodiment further includes, displaying on the user interface of the production control computer, events occurring on a computer dedicated to an Instructor/Presenter, and recording, editing, combining, and broadcasting audio and videos signals, from the user interface via a network to a content viewer user interface.

BRIEF DESCRIPTION OF THE DRAWINGS

FIG. 4 illustrates an embodiment of the viewer user interface.

FIG. 5 illustrates an embodiment of a pre-recording setup form.

FIG. 6a illustrates a plan view of the Instructor/Presenter camera with two detectors, and the rotary base and stepper motor.

DETAILED DESCRIPTION

The term "server", when used here, is broadly understood to mean any computing entity or family of such entities capable of responding to user requests over a network. The computing entities may be computer servers or server farms, general purpose digital computers, personal digital assistants, special-purpose devices such as printers or scanners with digital processors built in, or specialized hardware devices such as XML chips or XML computers; either containing storage units or making use of storage units elsewhere on the network. The family of computing entities may be geographically distributed or may be "virtual" entities within a larger entity.

The term "video signal," when used here, is broadly understood to mean a digital representation of a video signal. It can be lossy or lossless, and can include any suitable format, including CCIR 601, MPEG-1, MPEG-2, MPEG-4, H.261, H.263, H.264, any codec-based, MiniDV, Digital8, DVD, or other formats already existing or yet to be invented.

The term "video camera", when used here, is broadly understood to mean a device for recording electronic moving images, and optionally, sound. It can include a professional video camera, studio camera, camcorder such as those sold for consumer and hobbyist use, webcam, closed-circuit television camera such as those used in surveillance, or any device capable of capturing video information. It can capture the video in analog or digital form. The digital signal can be any form of video signal according to the previous definition.

The term "audio signal", when used here, is broadly understood to mean any digital representation of an audio waveform. It can be lossy or lossless, and can include WAV, PCM, TTA, FLAC, AU, MP3, Ogg Vorbis, Windows Media Audio, TTA, RIFF, AIFF, IFF, BWF, Advanced Audio Coding, FLV or other format already existing or yet to be invented.

The term "microphone", when used here, is broadly understood to mean a device that converts sound into an electronic signal, whether a digital signal or an analog signal. It can include a capacitor, electret, dynamic, ribbon, carbon, or a piezo microphone, a lavalier microphone such as the kind often clipped to a speaker's clothing for active, hands-free use, or other. The digital signal can be any form of audio signal according to the previous definition.

The term "user interface control", when used here, is broadly understood to mean any suitable hardware or software permitting a human being to provide input to a computer. Hardware devices include joysticks, styluses, mice or other pointing devices, keyboards, touch screens, keypads, microphones and other computer peripherals already existing or yet to be invented. Software includes typed commands, hyperlinks, graphical user interface controls such as menus, buttons, choice lists, check boxes, radio buttons, and the like, already existing or yet to be invented. Software user interface controls can be provided via a command-line interface, graphical user interface, Web-based interface, gestural interface, tactile interface, or other.

The term "classroom," when used here, is broadly understood to mean a physical setting comprising one or more rooms in which one or more persons ("the Instructor/Presenter") deliver information to one or more audience members. It can include a classroom in any K-12 school, college, graduate school, training institute, corporate training center, hospital, military base, research institute, conference center, or other Instruction/Presentational setting, or a conference room in any for-profit, governmental or non-profit organization.

The term "PTZ," when used here, is broadly understood to mean pan, tilt, and zoom, three well known terms of art with respect to all cameras.

The term "detector" when used here, is intended to be synonymous with the term "sensor" in the provisional applications of which this application is a conversion. The term "emitter" when used here, is intended to be synonymous with the term "transmitter" in the provisional applications of which this application is a conversion. In the prior art, some universities and training institutions adopt several methodologies to deliver distance learning content to remotely located students/audience. Most of them are text and graphics based or delivered through CD-ROM or video tapes. The disadvantage of all these methods is that they are labor intensive as well as requiring a time consuming effort to transfer educational content to these media. In addition, the recorded content is fixed and cannot be kept current easily.

The true gold standard for educational content delivery is the traditional way of delivery—which is by a live Instructor/Presenter teaching in a class to students/audience physically located in a classroom, using a whiteboard and other educational aids like a computer and a projector for doing slide presentations. A common goal, then, is to capture this traditional form of delivery and all its elements and record it in electronic media for instant or nearly instantaneous remote delivery. In order to achieve this, many methods have been attempted in the prior art:

a) Video recording by a live production crew with a classroom. The disadvantage of this is that it is expensive to deploy such a crew and this is also an obtrusive presence in the class, which can be distracting.

b) Live attendance of traditional classes have been transmitted over controlled media like ATM networks, Intranets etc. They are referred to as video-teleconferencing networks. These yield a good quality of picture—but the problem is that the remote student has still to travel to a place where there is connectivity to this network. This limits the remote student population that can be served and limits the proliferation of this concept. Also an important element of distance learning is the ability of the student to achieve self-paced learning. Having to be at a given place at a given time reduces the utility of this approach.

c) Yet others have achieved recording of live lectures and a degree of automation by limiting the movement of the Instructor/Presenter and modifying the method of content delivery by eliminating the whiteboard completely and instead using pre-composed slides which can be more effectively transmitted over the internet after being recorded. This extends ability to reach a more paying student population since the transmission is over the internet and the remote student can take the class from wherever there is an internet connection.

The problem with this approach is that changing the method of delivery of Instruction/Presentation limits its potential for adoption. Also, seeing the Instructor/Presenter practically immobile and unable to walk about reduces him to a virtual talking head, thereby subtracting from the richness of the in-person delivery.

In light of the foregoing, there exists a need in the art to achieve the following goals:

a) The Instructor/Presenter must be able to move around the classroom without restriction. He should not be constrained to having to be within the restrictive field of view of the camera(s).

b) The student-Instructor/Presenter interaction must be captured and recorded with clarity.

c) Whiteboard/blackboard activity must be recorded without restriction on the size or color of the whiteboard/blackboard or restriction on the size of the Instructor/Presenter's handwriting or the type of material he uses for writing.

d) The Instructor/Presenter must be able to continue using existing tools like slide projectors or other Instruction/Presentational equipment currently in use, and images and/or audio from these must be captured effectively.

e) Most importantly, this system must not introduce any additional technology overhead on the Instructor/Presenter. Many Instructor/Presenters in fields like humanities and social sciences are so technology-averse that they use the most traditional means of Instruction/Presentation—with the teaching material being restricted only to chalk and blackboard or a whiteboard and marker. There is a need in the art for a solution for such Instructors/Presenters as well.

f) It must not be necessary for every in-class student to be attached to a computer, nor must they be required to carry individual microphones. It must not be necessary to have individual cameras for every in-class student, nor may the in-class student be required to press any button before he/she interacts with the Instructor/Presenter. In other words, it must be like any traditional class.

g) Both live and recorded attendance should be possible.

Capturing classroom activity with good production values has the following advantages:

a) Having a recorded class as opposed to a live on-line class appears prima-facie to be an inferior choice but there are good reasons why it often turns out to be the preferred choice. On-line students/audience typically use the on-line option for reasons of convenience. A major factor in the choice is typically the inability to commit themselves to being at a certain place at a certain time. In addition, the option to avail of self-paced study and the ability to take a class any time and anywhere is a major convenience. These are typically features of asynchronous learning which have historically proven to be more popular than synchronous learning, which requires attendance at the time the class is being conducted. In globally distributed organizations, staff that needs to peruse the content may be at different time zones from where the live presentation is made. This makes live attendance even more awkward to achieve. Asynchronous attendance from recordings is distinctly advantageous even in the context of these organizations.

b) The ability to record classes reliably, inexpensively and with good production values increases the asset base of the university or organizations that collect the content since they can use this asset base to generate additional income as in the case of universities or to train their new staff from archived material. Currently, in-person traditional classes and development of content for on-line offering are separate activities—and they are a wasteful duplication of effort. Productivity almost doubles if the two can be combined with a single content delivery—the traditional delivery, which, being the de facto standard mode of delivery in universities, can never be eliminated. All this makes this methodology of content capture a valuable weapon to generate a better and more substantial economic remuneration to universities for their intellectual capital or source of cost savings for other types of organizations.

Figure 1:
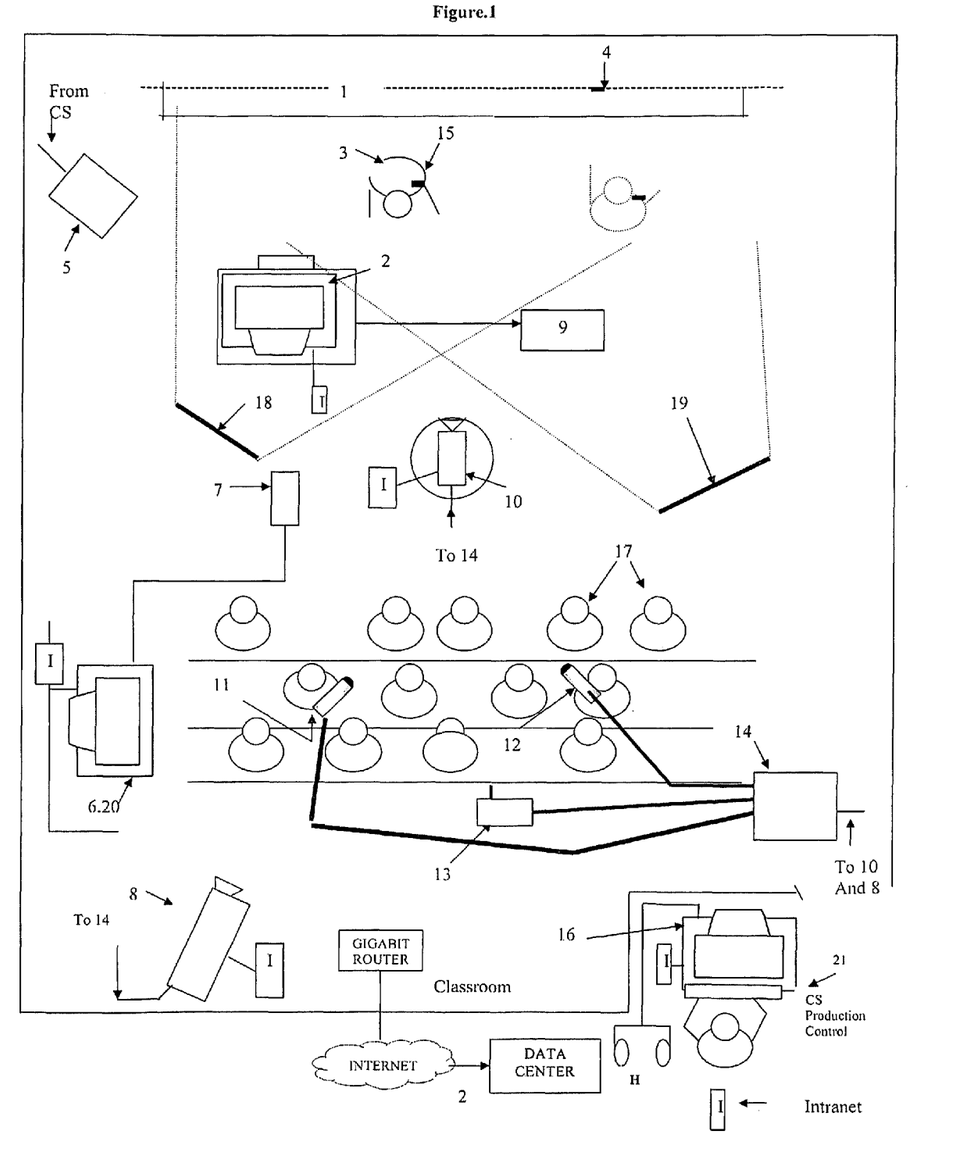
FIG. 1 illustrates the classroom ensemble which allows effective capture of a classroom or presentation.
Figure 2A:
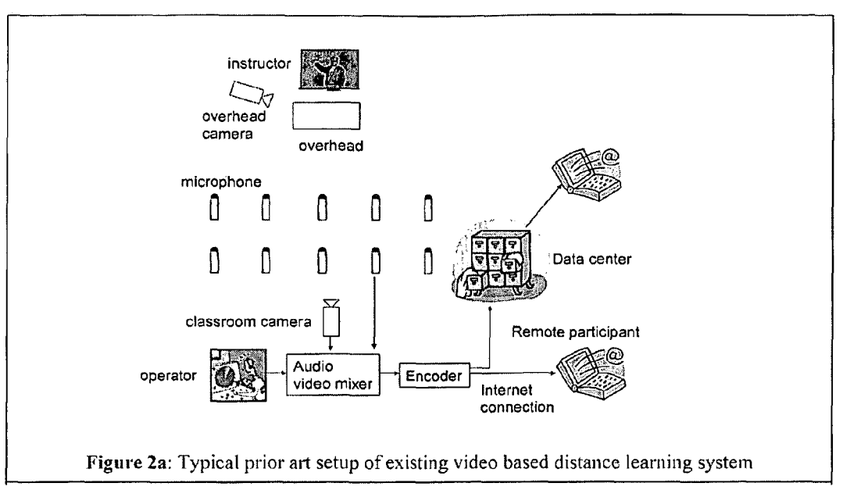
FIG. 2a illustrates prior art in the area of the invention.
Figure 2B:
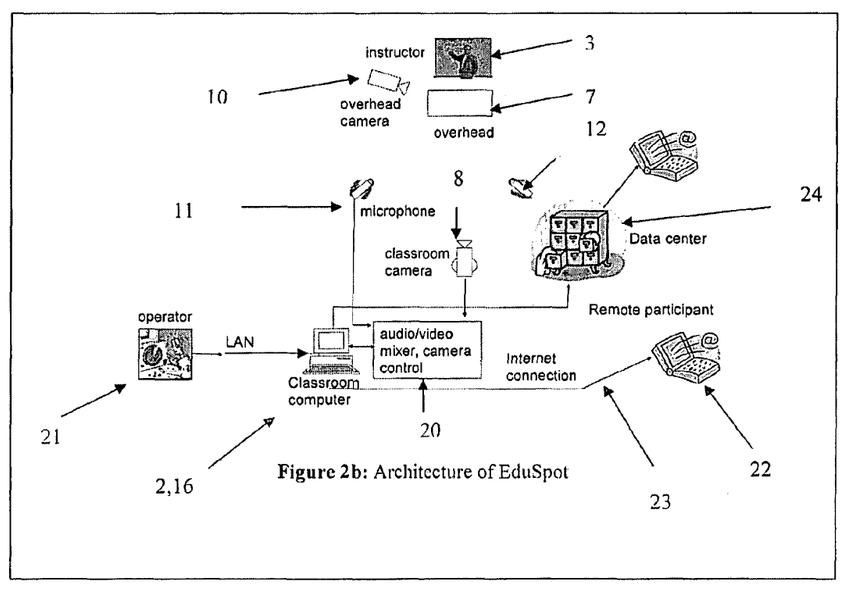
FIG. 2b illustrates the classroom setup in the invention.
Figure 3:
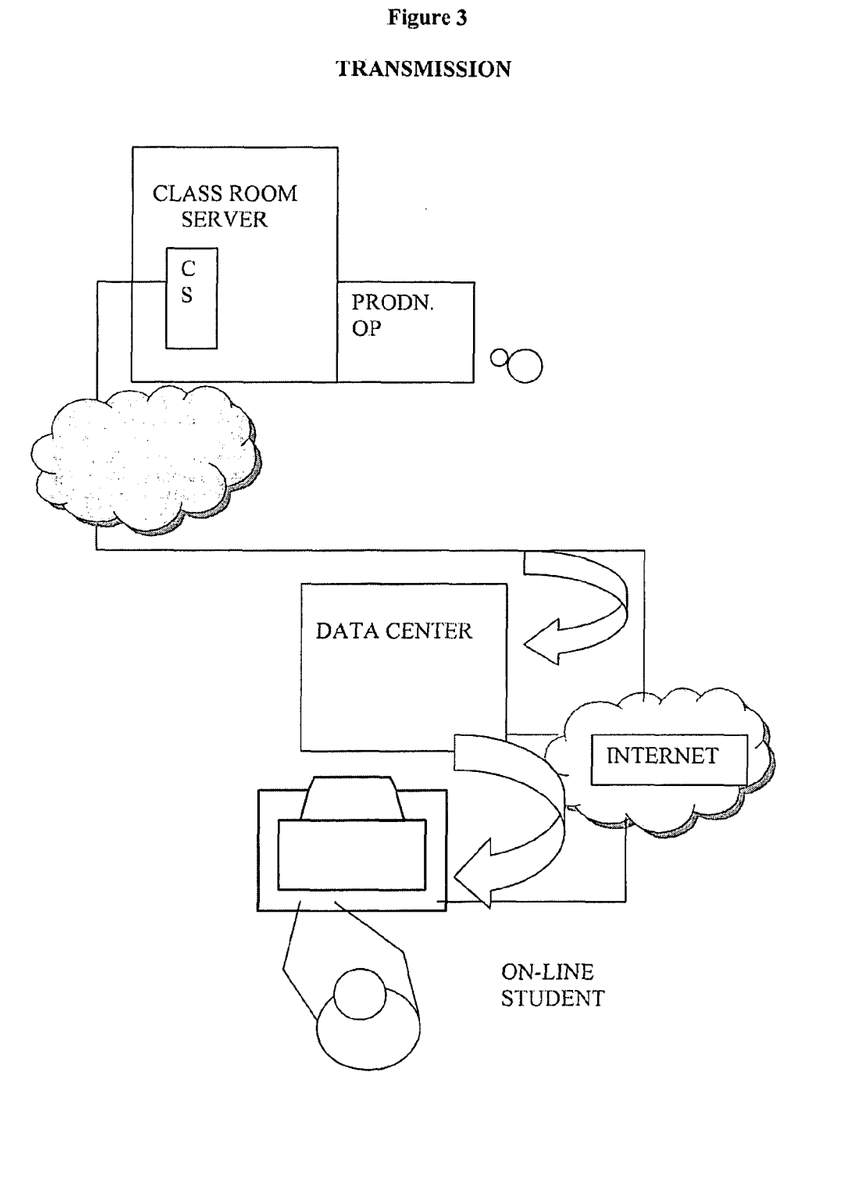
FIG. 3 illustrates data flow in the invention.

The invention as described herein meets the aforementioned goals. FIG. 2a illustrates a prior art setup for recording classroom Instruction/Presentation with an in-class production operator. FIGS. 1 and 2b illustrate a system embodiment of the invention. A whiteboard or blackboard 1 is shown at the front of the class. An Instructor/Presenter PC 2 is used for lecture notes, PowerPoint slides, etc by the Instructor/Presenter 3. Shown also is a whiteboard/blackboard activity sensor 4. A television monitor 5 is used to signal messages to the Instructor/Presenter from the operator 21 or other personnel outside the classroom. Router 6 is connected to the high-speed DSL connection. The classroom network 7 (e.g. Intranet) is connected to devices 2, 16, 8 and 10 where 8 is an audience PTZ video camera, to occasionally see an audience member or an attendee. There can be a plurality of such units. Each such unit is separately network-addressable. 9 is an overhead projector for use by the Instructor/Presenter. Pan/tilt/zoom (PTZ) Instructor/Presenter camera 10 is used for tracking the Instructor/Presenter, whiteboard/blackboard activity, and other activity at the front of the class. The Instructor/Presenter camera is separately network-addressable.

Figure 6B:
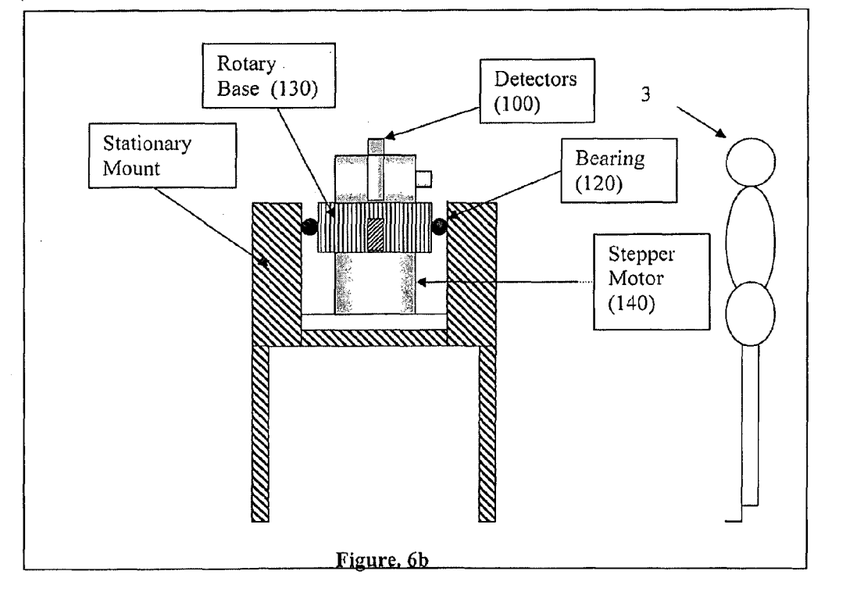
FIG. 6b illustrates an elevation view of the Instructor/Presenter camera with two detectors, and the rotary base and stepper motor.

In one embodiment, the Instructor/Presenter camera 10 is part of a larger assembly, shown in FIGS. 6a and 6b. 11 and 12 represent one or more omni-directional radio frequency microphones to pick up audience audio. The student microphones 11 and 12 are radio frequency microphones which can be passed around to any students/audience who wish to ask a question. 13 is an audio receiver for a wireless microphone worn by the Instructor/Presenter. 20 is an audio receiver for the audience microphones 11 and 12, and 14 is a mixer, to control and mix audio from different microphone receivers. Mixer 14 can be manually controlled by operator 21. 15 is a wireless microphone and positioning signal emitter for positioning, worn by the Instructor/Presenter. In one embodiment, 15 represents two separate devices, a microphone and an emitter, where the microphone is clipped to the Instructor/Presenter's shirt, tie, or other article of clothing, and the emitter is worn on the shoulder, so that transmissions are not blocked when the Instructor/Presenter turns his/her back.

The emitter, in one embodiment, emits infra-red signals. In one embodiment, an emitter of infrared at a peak wavelength of 940 nm may be used. A suitable device is marketed by Kodenshi with manufacturer's part number OPE5794. The emitter requires a power supply, electronics for amplification, and compensation for deterioration of the signal with age of the emitter. In other embodiments, an emitter of any suitable form of electromagnetic radiation such as RF signals, or ultrasonics, or any other form of signal capable of being received wirelessly at a distance may also be used. For example, RF-ID tags can also be used.

16 is the Classroom/Production Control server providing video input selection and recording. It is connected via a network to the classroom system, providing control of classroom components, routing and encoding of audio and video streams, temporary storage of content, and other functionality. 17 is the audience participating in the classroom and 18 and 19 are lights with dimmers that can be controlled electronically. 21 is a human operator, located inside or in the vicinity of the classroom and connected via a network.

As illustrated in FIG. 2b, 22 is a remote participant in the class, connected via a network 23. The datacenter 24 is at a central location with respect to all the locations where classrooms are being captured. This location gets data feeds from all the classroom servers 16 and this is the location where content management takes place and from where streaming servers feed the captured classroom sessions to the remotely located students/audience 22. The remote students/audience 22 have computers connected to the network, preferably with a broadband connection providing a high data rate. The streaming can be achieved through any firewalls that might be in place on these computers.

All the student microphones, for example 11 and 12 in the embodiment illustrated, feed into audio mixer 14 which detects and enhances the dominant student audio channel while switching off the others, and mixes it with the audio signal from Instructor/Presenter microphone 15. The output of the mixer 14 is fed into the Classroom/Production Control Server where the audio and video signals are combined to generate a composite encoded audio/video signal. The encoded composite audio/video outputs are recorded at the Classroom/Production Control Server 16.

Capture

In capturing classroom Instruction/Presentation, audio capture is the most important element, more important than video. Even if a few interruptions occur in the video or a few video frames are lost, the Instruction/Presentation does not lose its thread, but the audio must be perfect. The audio content has two components in the classroom context: the Instructor/Presenter audio and the student audio. Of the two, the Instructor/Presenter audio has the higher priority and therefore a dedicated microphone 15 is assigned to the Instructor/Presenter.

The distance between the microphones 11 and 12, and a specific student speaking may vary, as do the voices of different students/audience speaking, as well as the ability of the microphone to best pick up the student who is speaking. The microphone sensing the strongest signal may be boosted to the required level automatically by the mixer 14 and the other microphones 11 and 12 may be switched off to avoid any phase cancellation effect. This type of operation is known as automatic mixing. Commercially available automatic mixers, such as the SCM810 8-channel mixer from Shure, can be used as 14 to perform this function.

Audience Microphone Use

A challenge to taking questions from the audience may be getting the microphone to the speaker and the speaker's voice into the recording. In some cases, placing open microphones all over the room to pick up the voice of any speaker in the audience may cause several problems. The voice from a single speaker may reach several microphones at different phases. In some cases, when these inputs are amplified and added at the mixer, the resulting signal may be a messy jumble of signals which is almost equivalent to a speaker shouting into a well and the reflections cause the speech to be inaudible clearly.

A way to avoid this is for volunteers to identify the member of the audience and hand him a wireless microphone. This works quite well but is inelegant especially in a classroom situation where having such volunteers is impractical.

Figure 12:
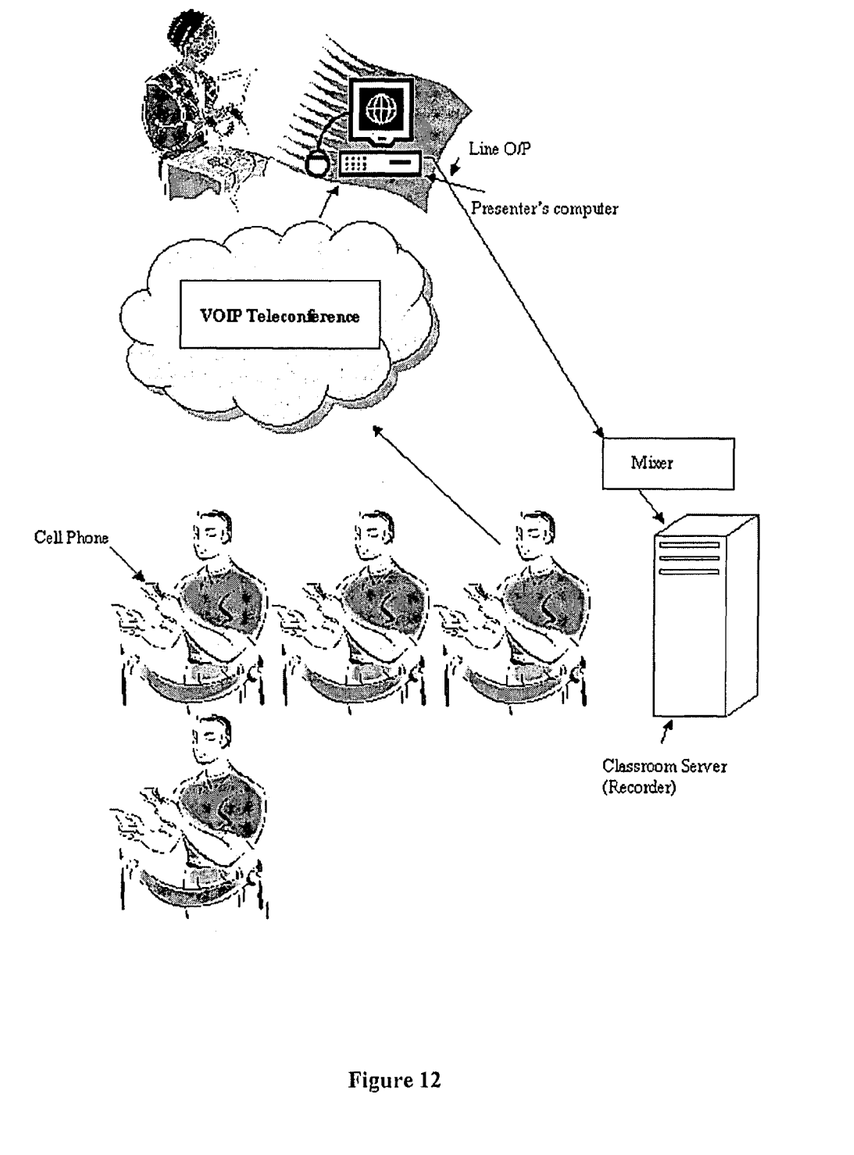
FIG. 12 illustrates the audience microphone use.

As illustrated in FIG. 12, one embodiment of a solution to this problem can make use of the fact that as time goes by, majority of students/audience in a classroom or members of an audience at an event are likely to be carrying cell-phones. In such an embodiment the phone can become the microphone that every one has. The presenter's computer is in most cases attached to a slide projector so that anything that shows on the presenter's computer gets projected on to the screen. If a slide presentation is started, every slide can include a message requesting the person who wants to ask questions to call a number, which can be a toll free number. When the questioner calls the number his number is can be bridged on to a VOIP based teleconference that may be automatically started by the presentation computer when the presentation starts. This teleconference preferably bridges audio only from the incoming telephone calls. An agent on the Presenter's computer may read the caller's ID from the incoming call and may add it to the list of members of the audience who wish to speak or ask a question. This can be accompanied by an audible beep. This in turn can also be projected on the screen for the audience to see the identity of the questioner/speaker.

In this example embodiment, the presenter may look at the list of members of the audience who want to speak, ask a question, or answer a question asked. The audio may arrive at a PC through the web based audio teleconference session and can be available on the PC speaker output as Line level output. This can be routed to the event speaker system or a simple PC Speaker for the audience to hear the question and will also be combined with the video for recording purposes. This way the questions from any members of the audience are taken and recorded by using the audience cell phones to serve as handy microphones.

Video Capture

The Internet controlled PTZ cameras 8 and 10 are placed facing different parts of the classroom. In a simple configuration, 2 such cameras suffice, while in some embodiments more audience cameras are deployed. PTZ cameras are capable of Panning, Tilting and Zooming based on commands from remotely located operator 21, who operates these cameras using the user interface depicted in FIG. 7.

Instructor/Presenter Camera Cruise Control:

FIGS. 6a and 6b illustrate the special features on the PTZ camera 10 facing the Instructor/Presenter. The camera assembly 10 is placed on a rotary platform 130 which is mounted on a stepper motor shaft 140. Two infrared detectors 100 are placed laterally across the camera, equidistant from the vertical axis—the line joining the detector is perpendicular to this axis. These detectors 100 detect the signal from the emitter 15 on the Instructor/Presenter's person.

In one embodiment, infrared detectors of a peak wavelength of 940 nm may be used as 100. A suitable detector is available commercially from Kodenshi with manufacturer's part number KP307R2. The detectors require a power supply and electronics for amplification. In other embodiments, any suitable detector capable of receiving the positioning signals emitted by 15 may be used. Alternatively, RF-ID tags can be used to establish the position of the Instructor/Presenter.

Figure 11:
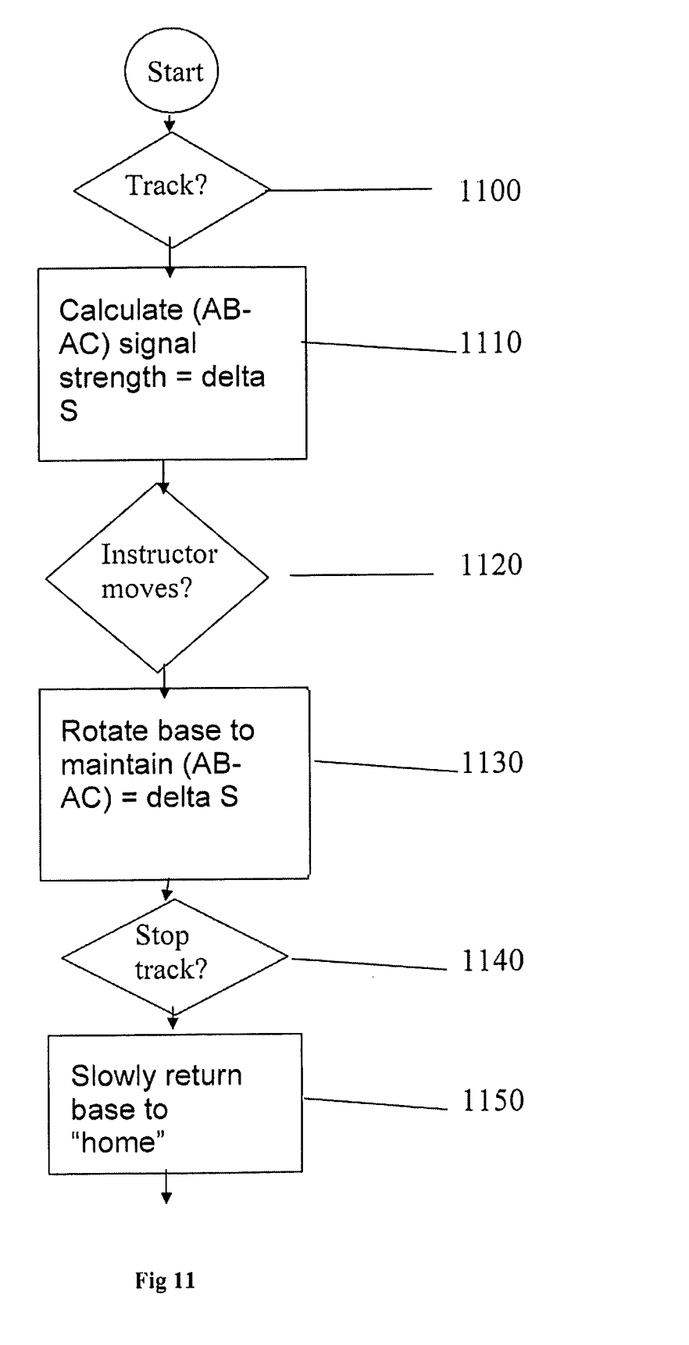
FIG. 11 illustrates the automatic tracking method of the Instructor/Presenter video camera based on detectors mounted on the camera.

The difference between the strengths of the signal perceived by the detectors 100 at the moment the operator 21 requests automatic tracking becomes the frame of reference. Automatic tracking is achieved by a dedicated software program configured on the production control computer 16, moving the stepper motor in the following manner illustrated in FIG. 11:

The program checks, at 1100, whether automatic tracking has been requested. If so, the program computes, at 1110, the absolute value of the difference S1 in the strengths of the signals measured by the first detector and the second detector. At 1120, the absolute value of the difference D is again computed, and if D is greater than S1, the Instructor/Presenter is considered to have moved. If the Instructor/Presenter has not moved, the algorithm moves back to step 1110. If the Instructor/Presenter has moved, at 1130 the base 130 is rotated towards the side of the camera 10 on which the detector whose strength is greater is mounted, until the original difference in strength is restored. Automatic tracking continues in this manner. If the operator now selects manual tracking, the algorithm rotates the base 130 to a "home" position.

Figure 8:
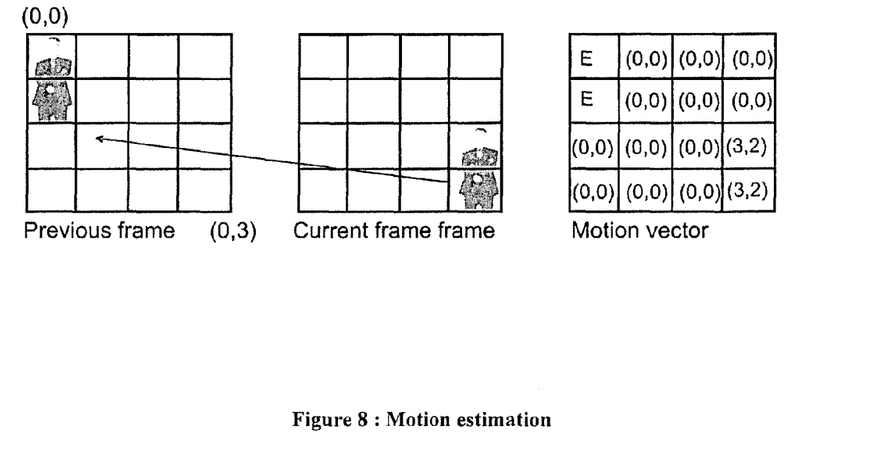
FIG. 8 illustrates software-based motion estimation.

Other methods of automatic tracking of a moving object without using an emitter mounted on the object are well-known in the art, namely motion detection, as illustrated in FIG. 8. In other embodiments, the invention can utilize one of these methods to cause the camera 10 to track the Instructor/Presenter 3.

If an RF-ID tag is used, then the location of the instructor is determined by two transmitters located at different parts of the room to which the RF-ID tag responds. The position of the instructor is then determined by triangulation.

Figure 7:
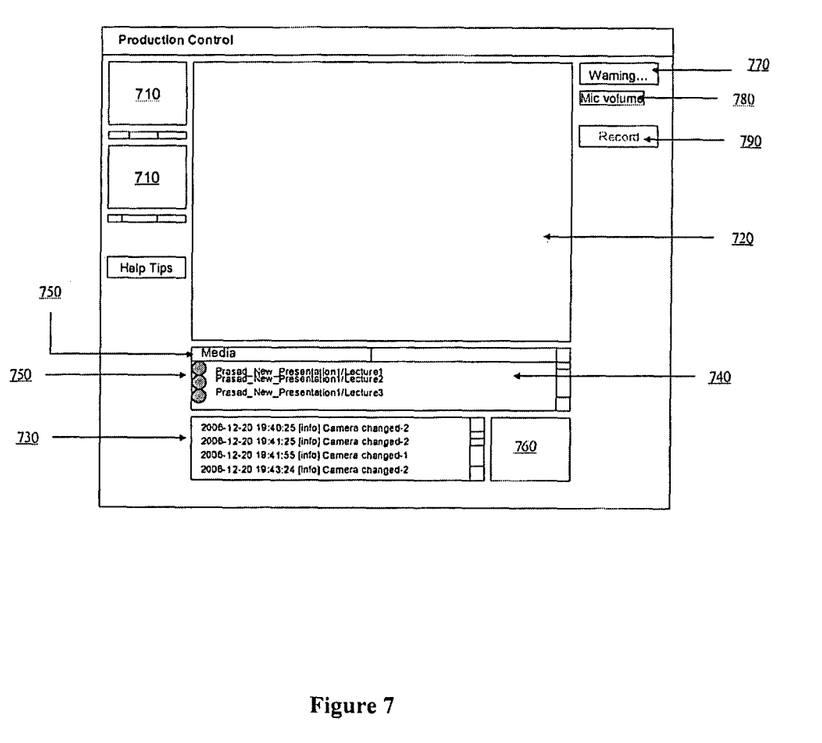
FIG. 7 illustrates an embodiment of the production control user interface.

Details of Production Control User Interface: FIG. 7 illustrates one embodiment of production control user interface. Thumbnails 710 illustrate the camera views, of which there may be more than two. Video image 720 is the selected view. Window 730 lists status reports, which reflect events occurring on the Instructor/Presenter's computer, as well as events during recording such as change in camera selection and slides being pushed. Window 740 provides information on the status of files being recorded. An empty red icon 750 indicates a recording is taking place. A red upward arrow icon 750 indicates a file is being uploaded. A red check-mark icon 750 indicates that file has been successfully uploaded to the streaming server. Window 760 shows the latest selected slide. Box 770 indicates whether production control is "waiting" for the Instructor/Presenter to setup the lecture and or presentation. Box 770 will display "Ready" after Instructor/Presenter's setup has been completed and will display "Recording" after the recording has been started. Microphone level indicator 780 next to the Microphone symbol displays the audio level of the signal going into the recorder. This enables the production controller to visually check if the Instructor/Presenter microphone, as well as the audience microphone, is active by separately asking someone to speak into them. Microphone level indicator 8 is active even if the recording has not started. Additionally the headphone H indicated on FIG. 1A is connected to the line output of the Classroom Server. The production controller monitors the sound on this to ensure that the audio level is okay. This is the most reliable means of ensuring the audio quality going in for recording. The operator can use the Mixer 14 to adjust the volume of the audio level going in for recording.

'Record' button 790 is to initiate recording and becomes active only after the system is ready for recording. When recording begins two additional buttons 'Pause' and 'Stop' become visible and active.

In an example embodiment operator 21 may control production by clicking on a point in the picture, so that the camera pans and tilts automatically so that the point that was selected now becomes the center of the picture. This works both on the selected camera view 720 as well as the thumbnail views 710. Essentially, on the production control user interface, the cameras can be controlled to center automatically to a portion of the view selected by dragging and clicking the mouse cursor on that portion of the view in the view window.

In an embodiment, the operator 21 may control speed at which the camera pans to the newly selected position. The control product user interface may include a 'Panning Speed' button. Pressing this button may present a slider, which may be positioned to increase or decrease the panning speed. Another button 'Default Speed' may bring the speed to the factory default value corresponding to the center of the slider.

In an embodiment, the operator 21 may define 'Home' positions for the cameras. Each thumbnail view 1 of the different camera views may have a 'Home' button. In such an embodiment, a specific camera may be selected, so that the user may position the camera for a given set of pan, tilt and zoom values; clicking 'Home' for that camera, may set the current Pan, Tilt and Zoom parameters of the selected camera as the 'Home' position for that camera. Subsequently, no matter what position this camera is at, pressing the home position may return the camera to a pre-defined 'Home' value.

In an embodiment operator 21 may pre-compose a camera view before selecting it for recording. This may allow production control of the unselected camera and positioning it properly before selecting its view for recording. This may allow that at every time the view being recorded is a presentable and properly composed view rather than allowing the viewer to see the entire process of composing a shot.

Content Viewer User Interface

FIG. 4 illustrates an example embodiment of the content viewer user interface. The user interface for the remote user may be divided into: video player 410 which plays back the video part of the recording; the thumbnail pictures 420 which may be thumbnails of the frames captured at the beginning of a new chapter, or thumbnails of the new slides introduced at the beginning of a new chapter; and the part of the screen where new slides are expanded/magnified and shown in sharp detail.

In such an embodiment, an enlarged content 440 of the thumbnail may be displayed as an overlay on the space reserved for displaying the slide, when remote user brings the cursor to any thumbnail picture. Since the contents on the thumbnails are not clearly visible for the remote student to decide at what point he wishes to start playing the recorded content, this enlarged view 440 may enable the user to decide if it is the point at which the remote user wishes to start playing. This may be possible whether or not the recorder is playing.

In an embodiment, a new chapter may be created based on the introduction of a new slide by the Instructor/Presenter; if the Instructor/Presenter uses a slide presentation on his computer, the point at which a new slide is presented may be a starting point of a new chapter.

Pre-Recording Setup

FIG. 5 illustrates an embodiment of a pre-recording setup form that is completed prior to the beginning of the lecture on either the Instructor/Presenter's computer 2 or the production control computer 21. In such an embodiment, if the form is filled from the presenter's computer, the system can be configured to expect slides to be captured during presentation, and if it is filled from the production control computer, then it can be expected that there will be no slides during the presentation. In such a case where there are no slides during the presentation, the system can capture the video in a high-resolution format as well as a lower resolution format derived from the high-resolution format. The high-resolution video may be saved on the production control computer and the low resolution one may be sent to the media server for streaming. In one example, the high-resolution version can be used for burning into DVD's. This methodology enables video only events to be treated separately from business presentations using slides. Additionally, simultaneous web-casting and uploading of data to the data center for recording can be implemented so that the upload is complete as soon as a web-cast is completed. Also, post production synchronization is eliminated/replaced by real-time synchronization of audio, video and slides presented on the Instructor/Presenter computer.

System Interactions

Figure 9:
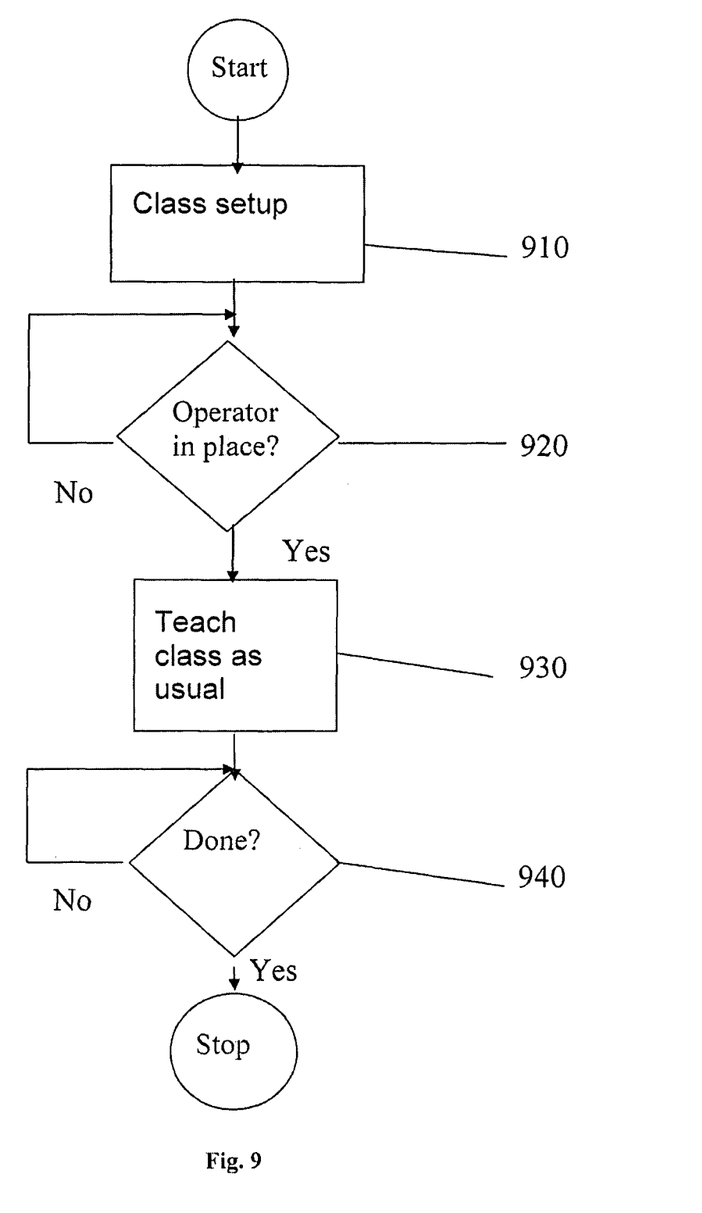
FIG. 9 illustrates the Instructor/Presenter's actions in teaching a class.
Figure 10:
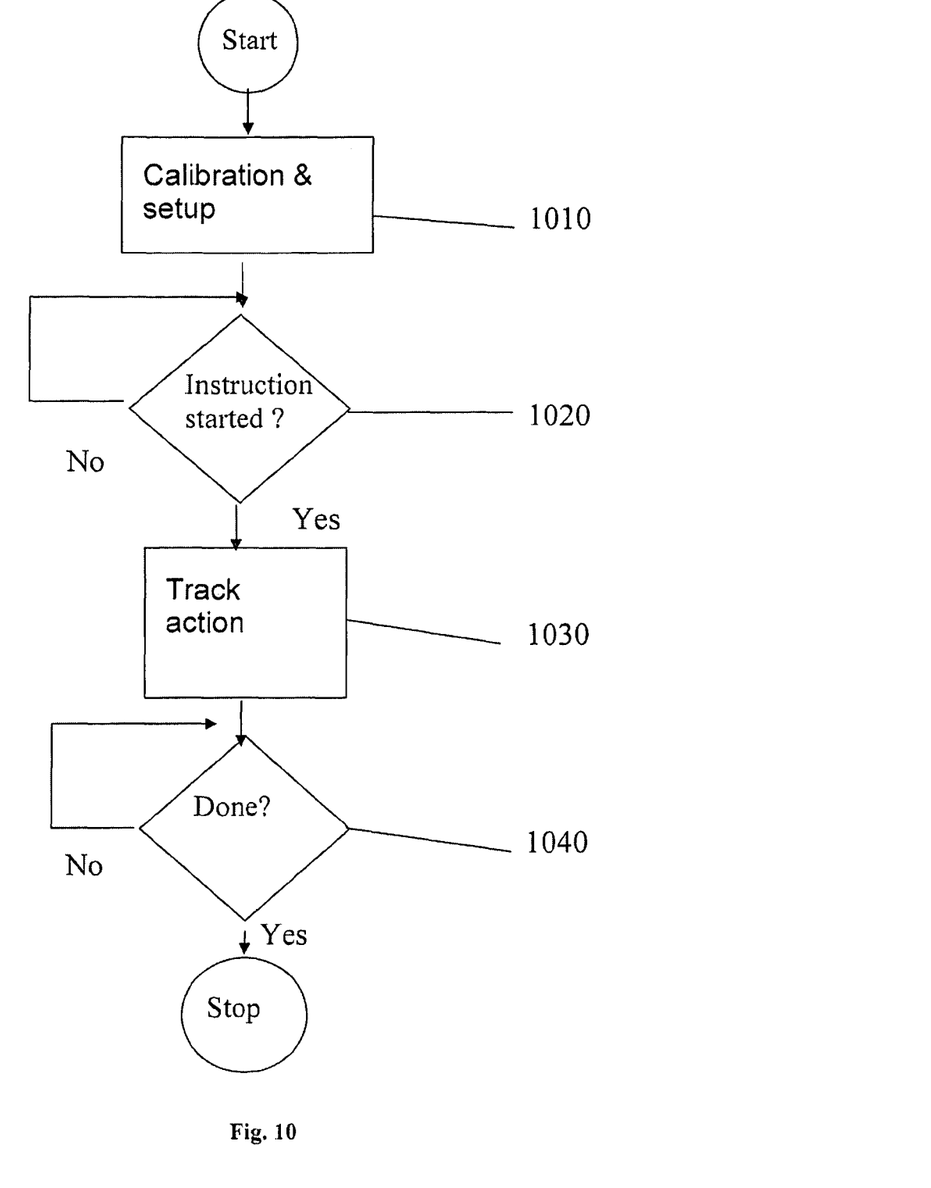
FIG. 10 illustrates the operator's actions in recording a class.

FIG. 9 depicts the flow chart of the Instructor/Presenter 3's interaction with the system and FIG. 10 shows how the operator 21 interacts with the system: At 910, the Instructor/Presenter 3 enters the room and uses the Instructor/Presenter computer 2 to set up the classroom by entering details like course information, lecture number and course title. Instructor/Presenter 3 also types one or more keywords representing the main themes of the lecture and completes the set up. As soon as this is done, the RECORD button on the UI gets activated and this signals to the remote operator 21 that the Instruction/Presentation is about to start and recording can commence.

While the camera 10 trained on the Instructor/Presenter is selected, the operator 21 might choose the CRUISE mode 480 to try and minimize his having to intervene manually in the production process. When the camera is put on the CRUISE mode, the currently-installed automatic tracking system is selected. If the operator 21 intervenes and manually tries to operate the camera movement via user interface controls 730, 740, or 750, the system reverts to the manual mode and returns control to the operator till CRUISE mode is again requested.

When the operator 21 selects the video signal from Instructor/Presenter camera 10 to send for recording, the student cameras 8 are all zoomed back to wide angle position so that the thumb nail views 720 show more panoramic views of the class from their standpoint rather that a zoomed in view. This enables the operator to see the entire view of the class from various angles so that he can determine where the point of interest in the class lies. If it were to remain trained zoomed in on only a portion of a class or a student, then any interesting action in the vicinity might be missed. The operator continues in this manner till the entire class is recorded and stops the recording process once the Instructor/Presenter stops the delivery.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description but by the claims following.

I claim:

1. A system for recording, broadcasting or webcasting a classroom lecture or presentation, event, court proceedings or black or whiteboard-based lecture, comprising:

a processing unit and a memory element, the memory element having instructions encoded thereon, wherein the instructions cause the processing unit to:

through a user interface, control via a network, two or more video cameras in a classroom or real-time event;

assign at least a first camera to capture at least one of a presenter and an instructional element selected from the group of: black or whiteboard, an experiment, a dissection, a flipchart, a wall poster or projected computer screen; and assign a second camera to capture an audience, wherein the cameras are pan, tilt, zoom(PTZ)-controllable over the network, and wherein the first video camera is adapted to, through the user interface, follow the movement of the presenter or the instructional element, in real-time within the classroom or the event;

assign a first microphone to the presenter;

provide audio and video input selection and recording, control of classroom components, routing and encoding of audio and video streams, and temporary storage of content;

receive slides associated with a live presentation by a human from a presenter computer, combine the received slides with captured audio and video, and synchronize the combined content in a captured event session, wherein the receive, combine and synchronize steps are performed in real-time; and broadcast the captured event session to an audience via a single or plurality of streaming servers, wherein the captured event session comprises the captured audio and video and the received content pushed from the presenter computer, and is presented in a single webpage, wherein the captured event session is simultaneously recorded on a single or plurality of servers accessible for subsequent replay from a remote computer, and wherein the single or plurality of servers allow random access of portions of the content; and cause a second plurality of audience controlled cell-phones or handheld wireless devices to function as audience-assigned microphones;

wherein the user interface is further configured to:

display video signals from the cameras and audio signals from the microphones;

display the slides associated with the live presentation by a human received from the presenter computers;

provide controls in the user interface to permit cuts between the video signals from the cameras, follow movement of the subjects and compose shots by exercising the Pan, Tilt and Zoom functions of the cameras;

provide a first status report window which displays events occurring in the presenter's computer, as well as events during recording including change in camera selection and slides from the live presentation or other content being pushed from the presenter computer;

provide a second status report window which displays information on files being recorded or uploaded to the single or plurality of servers;

provide a microphone level indicator which displays the audio level of the signal being recorded;

provide a mixer controller to allow adjustment of the volume of the recording of the audio level; and provide a plurality of camera angle views and controls for the cameras, wherein the user interface displays the plurality of camera angles in a plurality of thumbnail views and in a magnified selected view when a thumbnail view is selected, wherein the selected magnified view is based on one of a contextual reference to the content being pushed from the presenter's computer, and the presenter's spoken words, and wherein the user interface provides for manual manipulation of cameras from the selected view and from the thumbnail view.

* * * * *